United States Patent [19]

Taylor

[11] 4,274,644
[45] Jun. 23, 1981

[54] FOUR WHEELED HAND TRUCK

[76] Inventor: Frank E. Taylor, 1440 S. Seneca, Wichita, Kans. 67213

[21] Appl. No.: 71,320

[22] Filed: Aug. 30, 1979

[51] Int. Cl.³ .............................................. B62B 3/02
[52] U.S. Cl. .................................... 280/39; 280/641; 280/43.13
[58] Field of Search .................. 280/38, 39, 641, 642, 280/646, 654, 655, 47.17, 43, 43.17, 43.13, 40

[56] References Cited

U.S. PATENT DOCUMENTS

| | | | |
|---|---|---|---|
| 2,316,430 | 4/1943 | Hines | 280/43 X |
| 2,546,539 | 3/1951 | Fehn | 280/43.13 |
| 2,597,386 | 5/1952 | Schmid | 280/40 |

FOREIGN PATENT DOCUMENTS

| | | | |
|---|---|---|---|
| 660606 | 6/1936 | Fed. Rep. of Germany | 280/43.13 |
| 810999 | 1/1937 | France | 280/39 |
| 692490 | 7/1965 | Italy | 280/43 |
| 2117 | of 1911 | United Kingdom | 280/39 |
| 603953 | 6/1948 | United Kingdom | 280/39 |

*Primary Examiner*—John J. Love
*Assistant Examiner*—D. W. Underwood
*Attorney, Agent, or Firm*—John H. Widdowson

[57] ABSTRACT

A hand truck having a platform; a pair of wheel-connecting bars rotatably attaching to the platform; a plurality of wheels connecting to the bars, at least two of the wheels being rotatable thereon; and a handle member pivotally connecting at two points on an end of the platform and circumscribing three sides of the perimeter of the platform when the handle member is in a closed position. A handle release and locking means attaches to the platform and locks the handle member either in an open or in a closed position. The wheels fold up underneath the platform and lie horizontally with respect thereto when the handle member is in the closed position.

3 Claims, 15 Drawing Figures

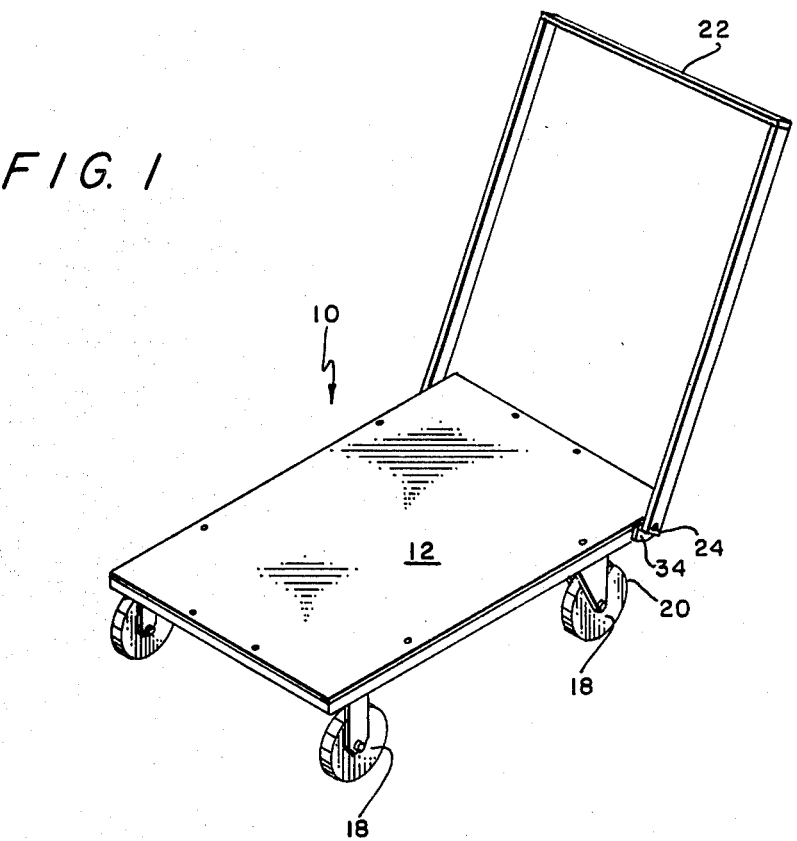
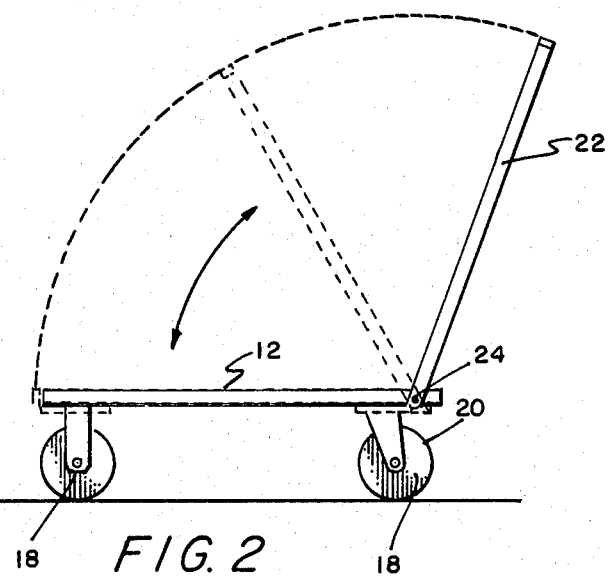
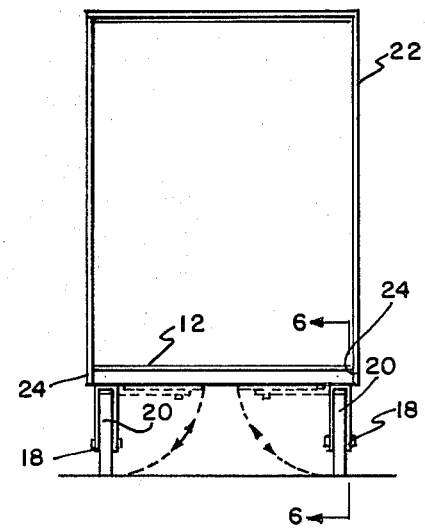

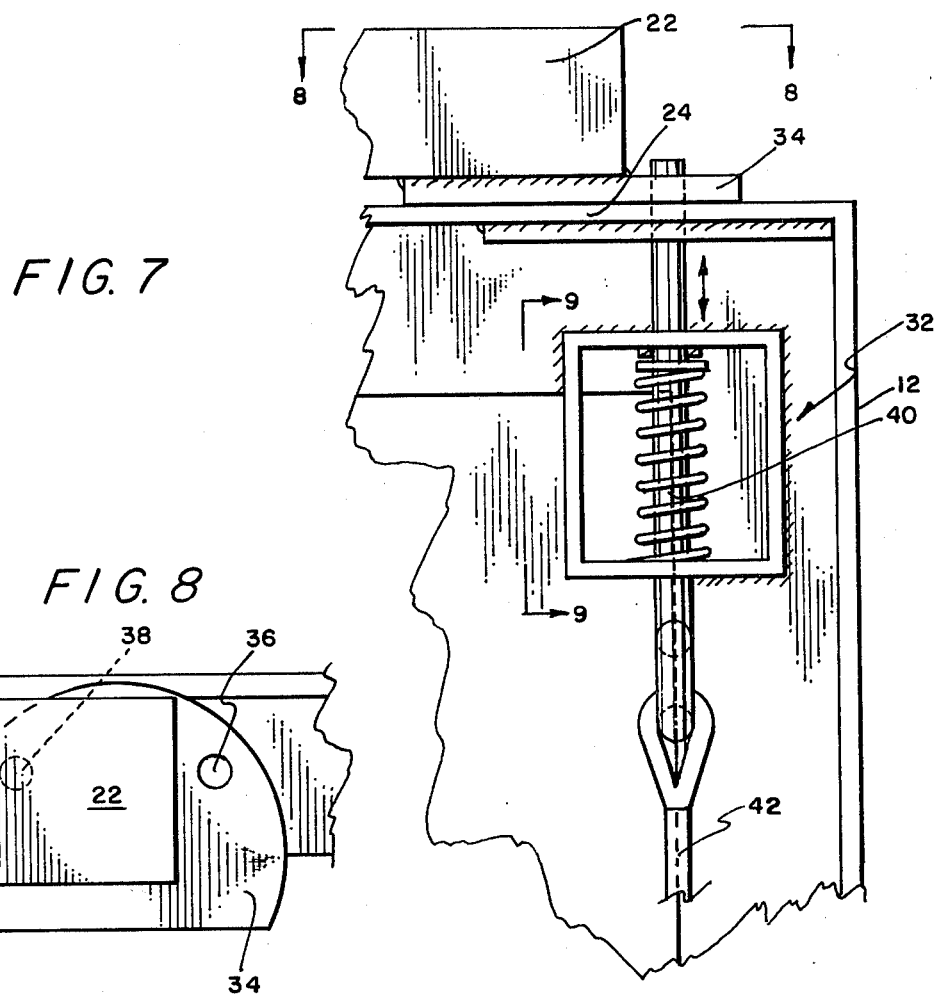
FIG. 7
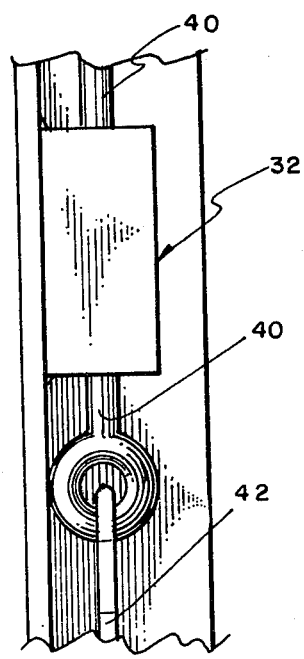
FIG. 8
FIG. 9

FOUR WHEELED HAND TRUCK

BACKGROUND OF THE INVENTION

1. Field of the Invention

This invention is related to a hand truck. More specifically, this invention provides for a four wheeled hand truck whose wheels are foldable against the underside of the truck body.

2. Description of Prior Art

U.S. Pat. No. 2,880,431 by Noland relates to loading dock plates which are moved from one position to another. U.S. Pat. No. 2,878,029 by Dahmen et al discloses a container having a pair of rollers disposed intermediate to the ends thereof and a handle structure which may be moved to a position to effect both retraction and extension of the rollers. U.S. Pat. No. 1,158,601 by Warlick discloses a table that may be moved on a wheeled base wherein the wheels may be folded against the underside of the base. None of the foregoing prior art disclose the specific type of hand truck disclosed by this invention.

SUMMARY OF THE INVENTION

It is therefore an object of this invention to provide a novel four wheeled hand truck.

Broadly, this invention provides a hand truck comprising a platform; a pair of wheel-connecting bars rotatably attached to the platform; a plurality of wheels connecting to the bars, at least two of the wheels being rotatable thereon; and a handle member pivotally connecting at two points on an end of the platform and circumscribing three sides of the perimeter of the platform when the handle member is in a closed position. A first gear means is connected to the end of the wheel-connecting bars, and a second gear means meshes with the first gear means and connects to the handle member in proximity to the points of pivotation with the platform. A handle release and locking means attaches to the platform and locks the handle member either in an open or in a closed position. In another embodiment of the invention, a first wheel-connecting bar and a second wheel-connecting rotatably attached to the platform. The wheels connect to both bars, and a wheel-position bar pivotally engages the first bar and pivotally connects to the second bar. The handle member pivotally connects at two points on an end of the platform and circumscribes three sides of the perimeter of the platform when the handle member is in a closed position. The handle member is additionally bound to the first wheel connecting bar to rotate some as the handle is pivoted about the points of pivotation with the platform, and engage the wheel-position bar resulting in the wheel-position bar rotating the second wheel bar to fold out the wheels to a perpendicular position.

The advantages and objects of the invention will become evident from the following detailed description when read in conjunction with the accompanying drawings which illustrate the preferred embodiments of the invention, by way of example only, wherein:

BRIEF DESCRIPTION OF THE DRAWINGS

FIG. 1 is a perspective view of an embodiment of the four wheeled hand truck according to the invention;

FIG. 2 is a side elevational view illustrating the path of the handle member in going from one position to another;

FIG. 3 is an end elevational view disclosing the path of the wheels as they fold underneath the platform of the four wheeled hand truck;

FIG. 7 is an enlarged partial horizontal sectional view of a spring-biased pin inserting into a plate integrally bound to the handle member;

FIG. 8 is a partial vertical sectional view taken along the plane of line 8—8 in direction of the arrows shown in FIG. 7;

FIG. 9 is a partial side elevational view taken along the plane of line 9—9 in direction of the arrows shown in FIG. 7;

DETAILED DESCRIPTION OF THE INVENTION

Figure 4:
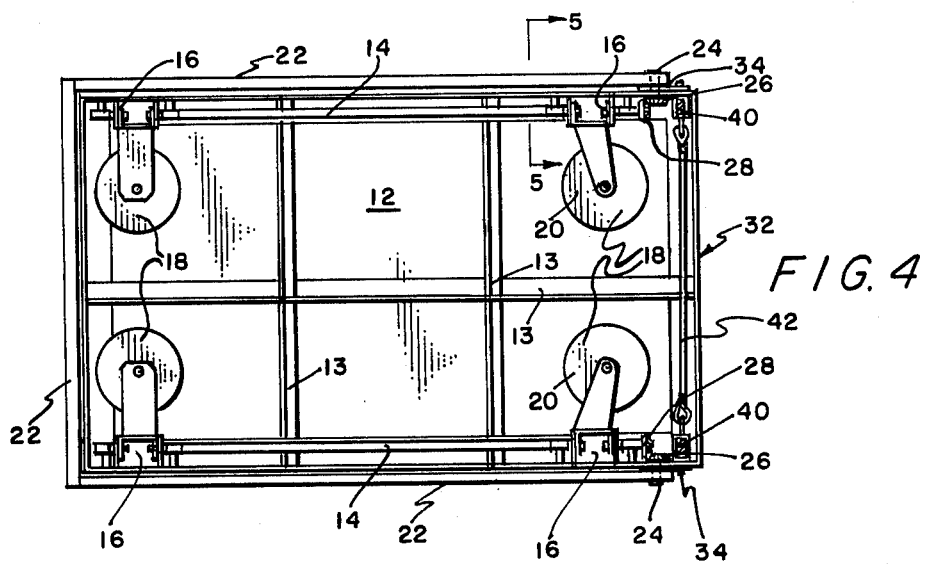
FIG. 4 is a bottom plan view of an embodiment of the four wheeled hand truck illustrating the wheels folded underneath the platform along with the handle member in a closed position, circumscribing the perimeter of the platform.
Figure 5:
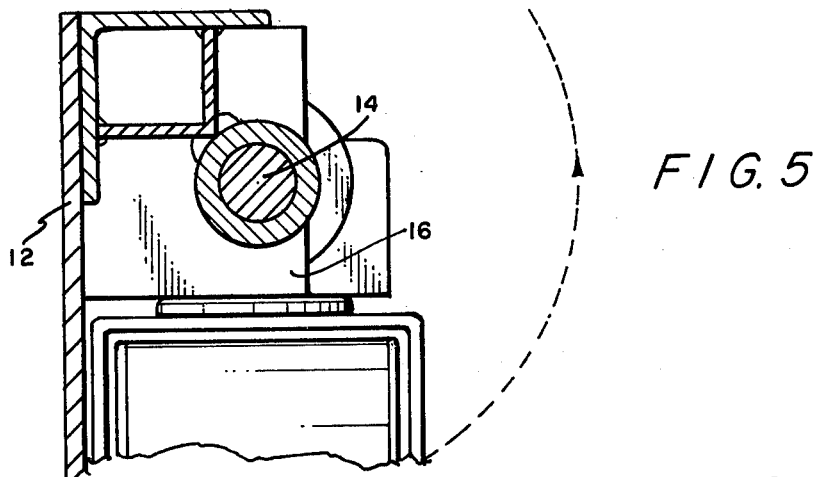
FIG. 5 is an enlarged partial vertical sectional view taken along the plane of line 5—5 in direction of the arrows shown in FIG. 4.
Figure 6:
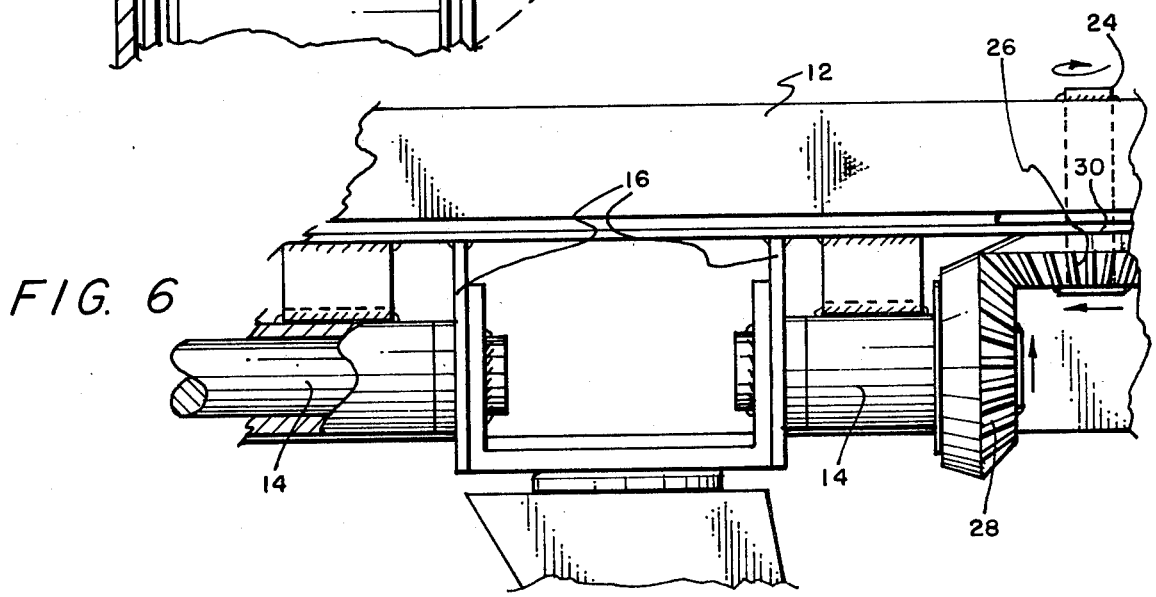
FIG. 6 is an exploded partial vertical sectional view taken along the plane of line 6—6 in direction of the arrows shown in FIG. 3.
Figure 10:
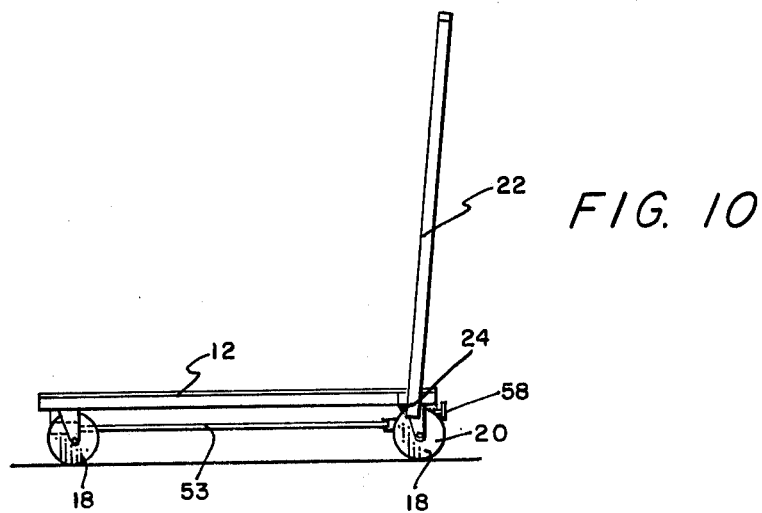
FIG. 10 is a side elevational view of another embodiment of the four wheeled hand truck.
Figure 11:
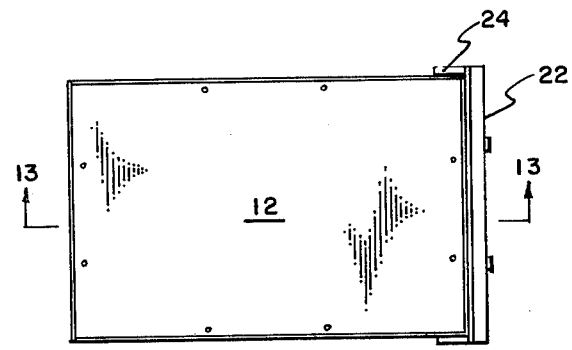
FIG. 11 is a top plan view of the embodiment of the four wheeled hand truck of FIG. 10.
Figure 12:
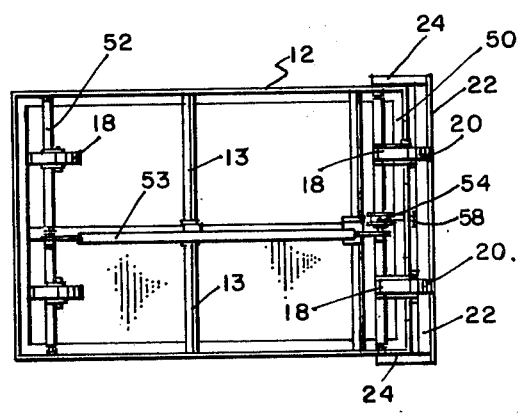
FIG. 12 is a bottom plan view of the embodiment of FIGS. 10 and 11 disclosing the wheels unfolded and the handle member in an open position.
Figure 13:
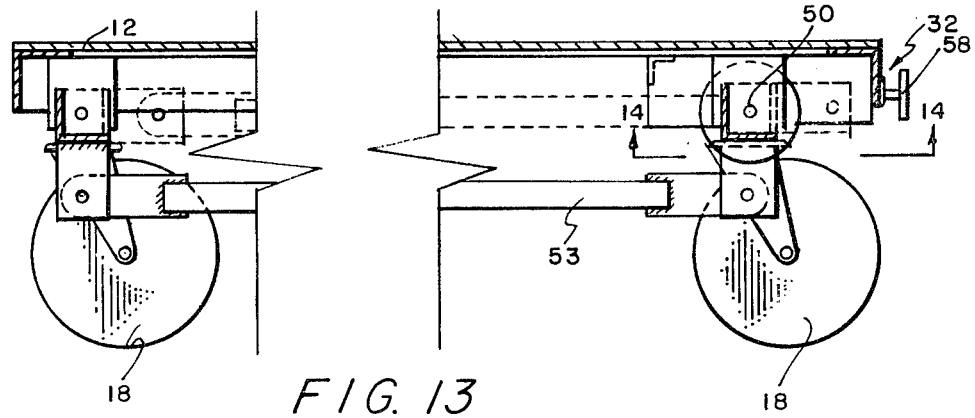
FIG. 13 is an enlarged partial vertical sectional view taken along the plane of line 13—13 in direction of the arrows, shown in FIG. 11.
Figure 14:
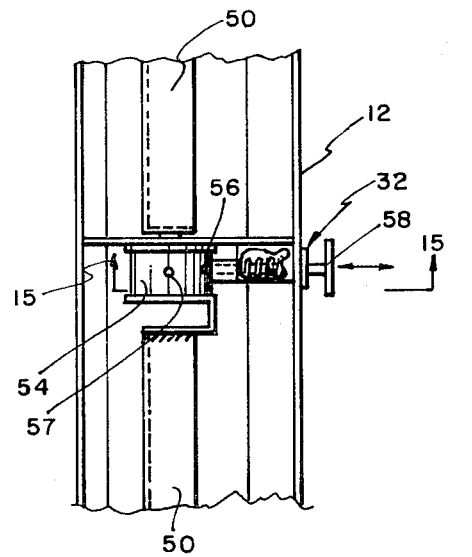
FIG. 14 is an exploded partial horizontal sectional view taken along the plane of line 14—14 in direction of the arrows shown in FIG. 13.
Figure 15:
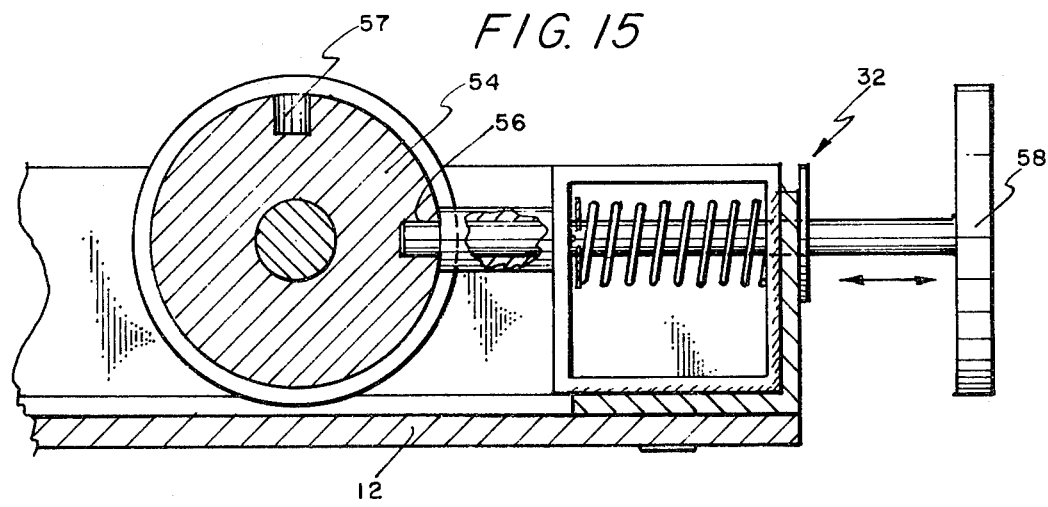
FIG. 15 is an enlarged partial vertical sectional view taken along the plane of line 15—15 in direction of the arrows shown in FIG. 14.

Referring in detail now to the drawings, wherein like reference numerals designate similar parts throughout the various views, and initially in particular to FIGS. 1-9, there is seen an embodiment of the invention, generally illustrated as 10, including a platform 12 with braces 13, a pair of wheel-connecting bars 14 rotatably attaching to the platform 12 via attaching members 16, and a plurality of wheels 18 connecting to the wheel-connecting bars 14. At least two of wheels 18, more particularly illustrated as 20, are rotatable on wheel-connecting bars 14. A handle member 22 pivotally connects at points 24 on an end of the platform 12 and circumscribes three sides (as shown in FIG. 3) of the perimeter of the platform 12 when the handle member 22 is in a closed position. Gear means 28 connects to the end of the wheel-connecting bars 14. Gear means 26 meshes with gear means 28 and connects to a shaft 30 which provides the pivot point 24 for which the handle member 22 pivots. A handle and release locking means, generally illustrated as 32, attaches underneath the platform 12 and locks the handle member 22 either in an open (as shown in FIGS. 1-3) or in a closed position (as shown in FIG. 4 and FIG. 12). A pair of plates 34 are integrally bound to the handle member 22 in proximity to the point of pivotation 24 of the handle member 22 with the platform 12, as seen in FIGS. 7 and 8. Plates 34 include an open aperture 36 and a closed aperture 38 as shown in FIG. 8. In a preferred embodiment of the invention illustrated in FIGS. 1-8, handle release and locking means 32 comprises a pair of spring biased locking pins 40 oppositely situated with respect to each other and a spring-biased pin contracting means, preferably a coil 42, attaches to the spring-biased pins 40 to contract the spring-biased pins 40 to release the handle member 22 from either the open position or the closed position. One of the pins 40 inserts into the open aperture 36 of one plate 34 and the other pin 40 inserts into the open aperture 36 of the other plate 34 when the handle member 22 is in the open position, and when the handle member 22 is in the closed position, pins 40 insert into closed apertures 38 of the plates 34.

In operation of the invention of the embodiment illustrated in FIGS. 1-8, wheels 18 fold up underneath the platforms 12 and lie horizontally with respect thereto when the handle member 22 is in the closed position (see FIG. 4). The wheels 18 fold out from underneath the platform 12 toward the eventual perpendicular position with respect to the underside of the platform 12 (see FIG. 3) as the handle member 22 is released when the coil 42 is pulled (causing spring-biased pins 40 to withdraw from closed apertures 38). Handle member 22 is pulled away from the platform 12 while pivoting at point of pivotation 24. This simultaneously causes gear means 26 to engage and turn the gear means 28, resulting in the wheel-connecting bars 14 to rotate and fold out the wheels 18 to the perpendicular position wherein the handle member 22 is positioned in the open position forming an oblique angle with respect to the top of the platform 12. In the open position, pins 40 insert into the open aperture 36 to lock the handle member 22.

Referring in detail now to FIGS. 10-15 for another preferred embodiment of the invention, a wheel connecting bar 50 and a wheel connecting bar 52 rotatably attach to the platform 12. Wheels 18 connect to bars 50 and 52. At least two of wheels 18, more particularly illustrated as 20, are rotatable on wheel connecting bar 50. The handle member 22 is bound to wheel connecting bar 50 to rotate same as the handle member 22 is pivoted about the point 24 with the platform 12. A wheel-position bar 53 pivotally engages the bar 50 and pivotally connects to bar 52. A cylindrical retention member 54, having open recess 56 and closed recess 57, is integrally bound to the wheel-connecting bar 50. The handle release and locking means 32 in this embodiment of the invention comprises spring-biased pins 58 situated at an end of the platform 12. Pin 58 lodges in open recess 56 when the handle member 22 is locked in the open position, and the pin 58 lodges in closed recess 58 when the handle 22 is in the closed position.

In operation of the invention of the embodiment illustrated in FIGS. 9-15, wheels 18 fold out from underneath the platform 12 toward an eventual perpendicular position with respect to the underside of the platform 12 as the handle member 22 is released, by pulling out the spring-biased pin 58, and pulled away from the platform 12 while pivoting at pivotation point 24. This simultaneously causes the wheel connecting bar 50 to rotate and engage the wheel position bar 53, resulting in the wheel position bar 53 rotating the wheel connecting bar 52, in order to fold out the wheels 18 to the perpendicular position wherein the handle member 22 is postured in the open position.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A hand truck comprising a platform; a pair of wheel-connecting bars rotatably attaching to the platform; a plurality of wheels connecting to the bars, at least two of said wheels being rotatable thereon; a handle member pivotally connecting at two points on an end of said platform and circumscribing three sides of the perimeter of the platform when the handle member is in a closed position; a first gear means connected to the end of said wheel-connecting bars; a second gear means meshing with the first gear means and connecting to the handle member in proximity to the points of pivotation with the platform; handle release and locking means attached to the platform and locking the handle member either in an open or in the closed position; said wheels folding up underneath the platform and lying horizontally with respect thereto when the handle member is in the closed position; said wheels folding out from underneath the platform toward an eventual perpendicular position with respect to the underside of the platform as the handle member is released by the handle release and locking means and is pulled away from the platform while pivoting at said points of pivotation, simultaneously causing said first gear means to engage and turn said second gear means resulting in the wheel-connecting bars rotating to fold out said wheels to the perpendicular position wherein said handle member is postured in the open position forming an oblique angle with respect to the top of the platform, said hand truck additionally including a pair of plates, each having an aperture for an open position and an aperture for a closed position, and each oppositely situated with respect to each other and integrally bound to said handle member in proximity to said points of pivotation of said handle member with said platform, said handle release and locking means is connected underneath the platform and thereto; said handle release and locking means comprises a pair of spring-biased locking pins oppositely situated with respect to each other, one of said pins inserting into the aperture for an open position of one plate and the other pin inserting into the aperture for an open position of the other plate when said handle member is in the open position, and when said handle member is in the closed position, one of said pins inserts into the aperture for a closed position of one plate and the other pin inserts into the aperture for a closed position of the other plate; and a spring-biased pin contracting means attached to said spring-biased pins to contract said spring-biased pins to release said handle member from either the open position or the closed position.

2. The hand truck of claim 1 wherein said spring-biased pin contracting means is a coil.

3. A hand truck comprising a platform; a first wheel-connecting bar and a second wheel-connecting bar, both rotatably attaching to said platform; a plurality of wheels connecting to said first and second bar, at least two of said plurality of wheels being rotatable thereon; a wheel-position bar pivotally engaging the first bar and pivotally connected to the second bar; a handle member pivotally connecting at two points on an end of said platform and circumscribing three sides of the perimeter of the platform when the handle member is in a closed position, said handle member being additionally bound to said first wheel-connecting bar to rotate same as said handle is pivoted about the points of pivotation with the platform; handle release and locking means attaching to the platform and locking the handle member either in an open or in the closed position; said wheels folding up underneath the platform and being horizontally with respect thereto when the handle member is in the closed position; said wheels folding out from underneath the platform toward an eventual perpendicular position with respect to the underside of the platform as the handle member is released by the handle release and locking means and is pulled away from the platform while pivoting at said points of pivotation, simultaneously causing said first wheel-connecting bar to rotate and engage the wheel-position bar resulting in said wheel-position bar rotating said second wheel bar, in order to fold out said wheels to the perpendicular position wherein said handle member is postured in the open position, a cylindrical retention member having a structure defined by at least one recess, said retention member being integrally bound to said first wheel-connecting bar, said handle release and locking means is connected underneath the platform and thereto, said retention member including an open recess and a closed recess, said handle release and locking means comprises a spring-biased pin situated at an end of the platform, said pin being inserted into the open recess when said handle member is locked in the open position and said pin being inserted into the closed recess when said handle is postured in the closed position.

* * * * *